US011338529B2

(12) United States Patent
Shimono et al.

(10) Patent No.: US 11,338,529 B2
(45) Date of Patent: May 24, 2022

(54) REPAIR PATCH, METHOD FOR MOLDING REPAIR PATCH, METHOD FOR REPAIRING COMPOSITE MATERIAL, AND MOLDING JIG (71) Applicant: MITSUBISHI HEAVY INDUSTRIES, LTD., Tokyo (JP)

(72) Inventors: Kodai Shimono, Tokyo (JP); Koichi Hasegawa, Tokyo (JP); Takuma Hirai, Tokyo (JP); Shunsuke Yoshino, Tokyo (JP); Jo Nishimuro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 141 days.

(21) Appl. No.: 16/756,035

(22) PCT Filed: Aug. 20, 2018

(86) PCT No.: PCT/JP2018/030651
§ 371 (c)(1),
(2) Date: Apr. 14, 2020

(87) PCT Pub. No.: WO2019/077860
PCT Pub. Date: Apr. 25, 2019

(65) Prior Publication Data
US 2020/0254699 A1 Aug. 13, 2020

(30) Foreign Application Priority Data
Oct. 17, 2017 (JP) .............................. JP2017-201302

(51) Int. Cl.
B29C 70/10 (2006.01)
B29C 73/06 (2006.01)
(Continued)

(52) U.S. Cl.
CPC ............. B29C 70/10 (2013.01); B29C 73/06 (2013.01); B29C 73/10 (2013.01); B29C 65/486 (2013.01);
(Continued)

(58) Field of Classification Search
CPC ......... B29C 70/10; B29C 70/06; B29C 70/28; B29C 70/30; B29C 70/68; B29C 70/681;
(Continued)

(56) References Cited

U.S. PATENT DOCUMENTS

2010/0011580 A1* 1/2010 Brennan ............... B29C 70/541
29/700
2011/0174427 A1* 7/2011 Colby ..................... B29C 73/10
156/95
(Continued)

FOREIGN PATENT DOCUMENTS

EP   0 839 635    5/1998
JP   11-348141    12/1999
(Continued)

OTHER PUBLICATIONS

Office Action dated Jun. 1, 2021 in Japanese Patent Application No. 2017-201302, with English-language translation.
(Continued)

Primary Examiner — Philip C Tucker
Assistant Examiner — Brian R Slawski
(74) Attorney, Agent, or Firm — Wenderoth, Lind & Ponack, L.L.P.

(57) ABSTRACT

A repair patch includes a composite material to repair a a repair target of a composite material. The repair patch includes bonding surfaces which face a bonded surface of a counterbored hole formed in the part to be repaired, and are bonded to the counterbored hole; and an opposite surface opposite to the bonding surfaces in a thickness direction.
(Continued)

The opposite surface has a curved plane with a first surface side curvature radius protruding toward the opposite surface in a cross section cut along a plane intersecting an axial direction in the opposite surface. The bonded surface has a curved plane with a second surface side curvature radius protruding toward the bonding surfaces facing the bonded surface in a cross section cut along a plane intersecting an axial direction in the bonded surface. The first surface side curvature radius is smaller than the second surface side curvature radius.

18 Claims, 7 Drawing Sheets

(51) Int. Cl.
| | | |
|---|---|---|
| | B29C 73/10 | (2006.01) |
| | B32B 37/10 | (2006.01) |
| | B29C 65/00 | (2006.01) |
| | B29C 65/48 | (2006.01) |
| | B32B 37/12 | (2006.01) |

(52) U.S. Cl.
CPC .... *B29C 65/4835* (2013.01); *B29C 66/00145* (2013.01); *B29C 66/301* (2013.01); *B29C 66/721* (2013.01); *B29C 66/82661* (2013.01); *B29C 66/91443* (2013.01); *B32B 37/1009* (2013.01); *B32B 37/1207* (2013.01); *B32B 2556/00* (2013.01)

(58) Field of Classification Search
CPC ....... B29C 70/682; B29C 70/70; B29C 73/06; B29C 73/10; B29C 65/00; B29C 65/48; B29C 65/483; B29C 65/4835; B29C 65/486; B29C 65/56; B29C 65/565; B29C 66/0224; B29C 66/301; B29C 66/00145; B29C 66/721; B29C 66/82661; B29C 66/91443; B29C 66/91445; B32B 37/1009; B32B 37/1207; B32B 37/1253; B32B 37/18; B32B 37/182; B32B 2556/00; B29L 2030/00
USPC ..... 156/60, 94, 98, 247, 277, 293, 297, 298, 156/303.1; 428/63, 98, 156, 161, 172, 428/174, 189
See application file for complete search history.

(56) References Cited

U.S. PATENT DOCUMENTS

| | | | |
|---|---|---|---|
| 2011/0259515 A1* | 10/2011 | Rotter | B32B 37/10 156/60 |
| 2012/0080135 A1* | 4/2012 | Evens | B32B 37/10 156/94 |
| 2012/0111478 A1 | 5/2012 | Akdeniz et al. | |
| 2013/0220503 A1* | 8/2013 | Shouyama | B29C 73/06 156/95 |
| 2014/0087143 A1 | 3/2014 | Pacchione et al. | |
| 2014/0141190 A1 | 5/2014 | Shigetomi et al. | |
| 2014/0295124 A1 | 10/2014 | Suhara et al. | |
| 2015/0231837 A1 | 8/2015 | Georgeson et al. | |
| 2016/0159057 A1 | 6/2016 | Butler | |
| 2018/0264759 A1* | 9/2018 | Garhart | B64F 5/00 |

FOREIGN PATENT DOCUMENTS

| | | |
|---|---|---|
| JP | 2013-545638 | 12/2013 |
| JP | 2014-100847 | 6/2014 |
| JP | 2014-188995 | 10/2014 |
| JP | 6124561 | 4/2017 |
| JP | 2018-114721 | 7/2018 |

OTHER PUBLICATIONS

Extended European Search Report dated Jun. 8, 2021 in European Patent Application No. 18867557.3.
Written Opinion of the International Searching Authority dated Sep. 25, 2018 in International (PCT) Patent Application No. PCT/JP2018/030651, with English Translation.
International Search Report dated Sep. 25, 2018 in International (PCT) Patent Application No. PCT/JP2018/030651, with English Translation.

* cited by examiner

REPAIR PATCH, METHOD FOR MOLDING REPAIR PATCH, METHOD FOR REPAIRING COMPOSITE MATERIAL, AND MOLDING JIG

TECHNICAL FIELD

The present invention relates to a repair patch that is made of a composite material to repair a part to be repaired which is a repair target of a composite material, a method for molding a repair patch, a method for repairing a composite material, and a molding jig.

BACKGROUND ART

In the related art, as a repair method for repairing a part to be repaired such as a damaged part which is a repair target of a composite material, there is known a method for repairing a composite material in which an area with a truncated cone shape which increases in diameter from a back surface side toward a surface side of the composite material is removed, and a repair material is bonded to a recessed portion formed by the removal (for example, refer to PTL 1).

CITATION LIST

Patent Literature

[PTL 1] Japanese Unexamined Patent Application Publication No. 6124561

SUMMARY OF INVENTION

Technical Problem

Incidentally, as an example of the part to be repaired, there is an outer peripheral surface (also referred to as a single contour plane) with a cylindrical shape which extends in an axial direction. In this case, a counterbored hole which is a recessed portion is formed in the single contour plane, and the counterbored hole is embedded with a repair material. As an example of the repair material which is used in the above-described part to be repaired, there is a repair patch disclosed in PTL 1. This repair patch has a truncated cone shape, and has a bottom surface, a top surface, and an inclined surface.

However, in the case where the repair patch with a truncated cone shape is bonded to the counterbored hole formed in the single contour plane, the repair patch is bonded to the counterbored hole with a peripheral edge portion of the repair patch bent. For this reason, a residual stress occurs in the peripheral edge portion of the repair patch to cause the peripheral edge portion to separate from the counterbored hole. Therefore, the peeling off of the peripheral edge portion of the repair patch occurs easily.

Figure 12:
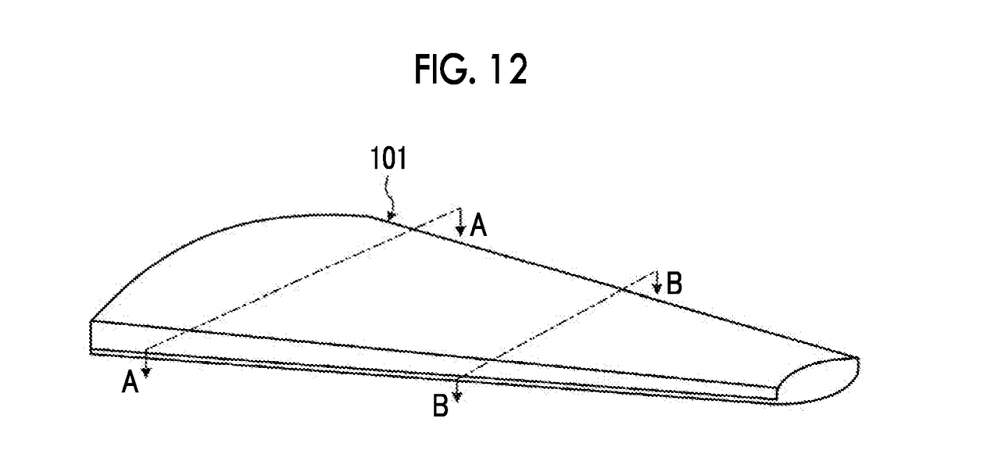
FIG. 12 is a schematic view showing a main wing outer panel.
Figure 13:
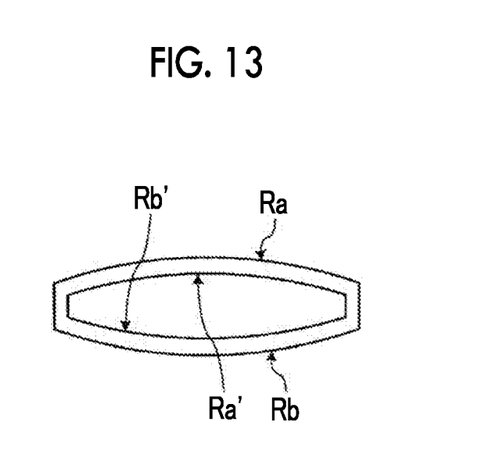
FIG. 13 is a schematic cross-sectional view where the main wing outer panel is cut by a cross section A-A.
Figure 14:
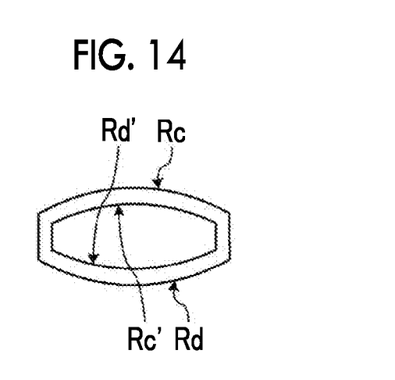
FIG. 14 is a schematic cross-sectional view where the main wing outer panel is cut by a cross section B-B.

In addition, as shown in FIGS. 12 to 14, in the case where the part to be repaired is, for example, a main wing outer panel 101 of an aircraft, when a cross section which is cut along a plane orthogonal to a wing length direction of the main wing outer panel is seen, the curvature radius of a single contour plane of an outer surface of the main wing outer panel 101 changes continuously in the wing length direction. For example, curvature radii Ra and Ra' of single contour planes of an outer surface and an inner surface on an upper side of the main wing outer panel 101 in a cross section A-A of a main wing on a wing root side is larger than curvature radii Rc and Rc' of a single contour plane of an outer surface on the upper side of the main wing outer panel in a cross section B-B of the main wing on a tip side. Similarly, curvature radii Rb and Rb' of single contour planes of an outer surface and an inner surface on a lower side of the main wing outer panel 101 is larger than curvature radii Rd and Rb' of single contour planes of an outer surface and an inner surface on the lower side of the main wing outer panel in the cross section B-B of the main wing on the tip side. In addition, this is not limited to the main wing outer panel 101 of the aircraft, and in the case where single contour planes of an outer surface and an inner surface of a fuselage, a tail wing, or the like are taken into consideration, there exist innumerable diameters. In preparing repair patches to correspond to the innumerable diameters, innumerable types of repair patches have to be prepared, which is difficult.

Therefore, an object of the present invention is to provide a repair patch, a method for molding a repair patch, a method for repairing a composite material, and a molding jig which are capable of properly repairing a part to be repaired even in the case where the part to be repaired is a curved plane.

Solution to Problem

According to the present invention, there is provided a repair patch that is made of a composite material to repair a part to be repaired which is a repair target of a composite material, the repair patch including a bonding surface that faces a bonded surface which is formed in the part to be repaired, and is bonded to the part to be repaired; and a surface that is opposite to the bonding surface in a thickness direction, in which the surface has a curved plane with a predetermined first surface side curvature radius in a cross section which is cut along a plane intersecting a predetermined direction in the surface.

According to this configuration, since the surface is capable of having a curved plane with the first surface side curvature radius, even in the case where a surface (for example, an outer peripheral surface or an inner peripheral surface) of the part to be repaired is a curved plane, the repair patch can be bonded according to the shape of the surface. Therefore, it is possible to reduce a residual stress which occurs in a peripheral edge portion of the repair patch to separate the peripheral edge portion from the part to be repaired, and it is possible to prevent the repair patch from peeling off from the part to be repaired.

In addition, it is preferable that the part to be repaired is an outer peripheral surface with a cylindrical shape which extends along an axial direction, the outer peripheral surface of the part to be repaired has a curved plane with a second surface side curvature radius which protrudes from a side of the outer peripheral surface toward an outer side of the cylindrical shape in a cross section which is cut along a plane intersecting the predetermined direction in the surface, the surface has the curved plane with the first surface side curvature radius which protrudes from a side of the bonding surface toward the surface, and the first surface side curvature radius is smaller than the second surface side curvature radius.

In addition, it is preferable that the part to be repaired is an inner peripheral surface with a cylindrical shape which extends along an axial direction, the inner peripheral surface of the part to be repaired has a curved plane with a second surface side curvature radius which is recessed from an inner side of the cylindrical shape toward the inner peripheral surface in a cross section which is cut along a plane intersecting the predetermined direction in the surface, the surface has the curved plane with the first surface side curvature radius which is recessed from a side of the surface toward the bonding surface, and the first surface side curvature radius is larger than the second surface side curvature radius.

According to this configuration, since the curvature radius of the curved plane of the surface of the repair patch is smaller than that of the curved plane of the outer peripheral surface of the part to be repaired, or is larger than that of the curved plane of the inner peripheral surface of the part to be repaired, when the repair patch is bonded to the part to be repaired, a residual stress occurs in a direction where the peripheral edge portion of the repair patch approaches the part to be repaired. For this reason, it is possible to apply the residual stress which occurs in the peripheral edge portion of the repair patch to cause the peripheral edge portion to approach the part to be repaired, and it is possible to further prevent the repair patch from peeling off from the part to be repaired. In addition, since the repair patch is molded as described above, the repair patch can be easily fitted to the part to be repaired, and thus, even in the case where a plurality of types of the repair patches are prepared in advance, the part to be repaired can be dealt with a small number of types of the repair patches.

In addition, it is preferable that in a case where the part to be repaired is an outer peripheral surface, a thickness of the repair patch in the thickness direction decreases from a central portion toward an outer side in the predetermined direction, and the first surface side curvature radius of the surface decreases from the central portion toward the outer side in the predetermined direction.

In addition, it is preferable that in a case where the part to be repaired is an inner peripheral surface, a thickness of the repair patch in the thickness direction decreases from a central portion toward an outer side in the predetermined direction, and the first surface side curvature radius of the surface increases from the central portion toward the outer side in the predetermined direction.

According to this configuration, the peripheral edge portion with a thin thickness on the outer side of the repair patch is easily deformed. For this reason, in the case where the part to be repaired is an outer peripheral surface, the first surface side curvature radius of the outer side is smaller than that of the central portion, and in the case where the part to be repaired is an inner peripheral surface, the first surface side curvature radius of the outer side is larger than that of the central portion; and thereby, the peripheral edge portion of the repair patch is easily fitted to the part to be repaired.

In addition, it is preferable that the composite material is obtained by infiltrating reinforcing fibers with a thermosetting resin, and the thermosetting resin is precured.

According to this configuration, the repair patch in a precured state can be arranged in the part to be repaired. For this reason, when the repair patch is to be completely cured, it is possible to soften the repair patch. Therefore, the repair patch can be suitably fitted to the part to be repaired, namely, the shape of the repair patch is capable of following the shape of the part to be repaired. For this reason, it is possible to prevent a residual stress from occurring in the repair patch, and it is possible to further prevent the repair patch from peeling off from the part to be repaired.

In addition, it is preferable that the repair patch further includes a peel ply that is peelably bonded to the bonding surface.

According to this configuration, since it is possible to activate the bonding surface by pulling off the peel ply, it is possible to improve the property of bonding to the part to be repaired.

In addition, it is preferable that in a case where the part to be repaired has a cylindrical shape which extends along an axial direction, and an indicator with which the axial direction is visually recognizable is attached to the surface.

According to this configuration, since it is possible to align the repair patch in the part to be repaired such that the axial direction in the outer peripheral surface or the inner peripheral surface with a cylindrical shape coincides with the indicator on the repair patch, it is possible to properly arrange the posture of the repair patch with respect to the part to be repaired.

According to the present invention, there is provided a method for molding a repair patch that is made of a composite material to repair a part to be repaired which is a repair target of a composite material, the method including a lay-up step of laminating a plurality of fiber reinforced preforms together on a mold surface by using a molding jig having the mold surface; and a molding step of heating and molding the plurality of laminated fiber reinforced preforms, in which the part to be repaired is an outer peripheral surface with a cylindrical shape which extends along an axial direction, in which a surface of the repair patch which is opposite to a bonding surface, which is bonded to the part to be repaired in a thickness direction, has a curved plane with a first surface side curvature radius which protrudes from a side of the bonding surface toward the surface in a cross section which is cut along a plane intersecting a predetermined direction in the surface, in which an outer peripheral surface of the part to be repaired has a curved plane with a second surface side curvature radius which protrudes from a side of the outer peripheral surface toward an outer side of the cylindrical shape in a cross section which is cut along a plane intersecting the predetermined direction in the surface, and in which the repair patch is molded by using the molding jig such that the first surface side curvature radius is smaller than the second surface side curvature radius.

According to the present invention, there is provided another method for molding a repair patch that is made of a composite material to repair a part to be repaired which is a repair target of a composite material, the method including a lay-up step of laminating a plurality of fiber reinforced preforms together on a mold surface by using a molding jig having the mold surface; and a molding step of heating and molding the plurality of laminated fiber reinforced preforms, in which the part to be repaired is an inner peripheral surface with a cylindrical shape which extends along an axial direction, in which a surface of the repair patch which is opposite to a bonding surface, which is bonded to the part to be repaired in a thickness direction, has a curved plane with a first surface side curvature radius which is recessed from a side of the surface toward the bonding surface in a cross section which is cut along a plane intersecting a predetermined direction in the surface, in which an inner peripheral surface of the part to be repaired has a curved plane with a second surface side curvature radius which is recessed from an inner side of the cylindrical shape toward the inner peripheral surface in a cross section which is cut along a plane intersecting the predetermined direction in the surface, and in which the repair patch is molded by using the molding jig such that the first surface side curvature radius is larger than the second surface side curvature radius.

In addition, according to the present invention, there is provided a molding jig for molding a repair patch that is made of a composite material to repair a part to be repaired which is a repair target of a composite material, in which the part to be repaired is an outer peripheral surface with a cylindrical shape which extends along an axial direction, in which a surface of the repair patch which is opposite to a bonding surface, which is bonded to the part to be repaired in a thickness direction, has a curved plane with a first surface side curvature radius which protrudes from a side of the bonding surface toward the surface in a cross section which is cut along a plane intersecting a predetermined direction in the surface, in which an outer peripheral surface of the part to be repaired has a curved plane with a second surface side curvature radius which protrudes from a side of the outer peripheral surface toward an outer side of the cylindrical shape in a cross section which is cut along a plane intersecting the predetermined direction in the surface, and in which the repair patch is molded such that the first surface side curvature radius is smaller than the second surface side curvature radius.

In addition, according to the present invention, there is provided another molding jig for molding a repair patch that is made of a composite material to repair a part to be repaired which is a repair target of a composite material, in which the part to be repaired is an inner peripheral surface with a cylindrical shape which extends along an axial direction, in which a surface of the repair patch which is opposite to a bonding surface, which is bonded to the part to be repaired in a thickness direction, has a curved plane with a first surface side curvature radius which is recessed from a side of the surface toward the bonding surface in a cross section which is cut along a plane intersecting a predetermined direction in the surface, in which an inner peripheral surface of the part to be repaired has a curved plane with a second surface side curvature radius which is recessed from an inner side of the cylindrical shape toward the inner peripheral surface in a cross section which is cut along a plane intersecting the predetermined direction in the surface, and in which the repair patch is molded such that the first surface side curvature radius is larger than the second surface side curvature radius.

According to this configurations, even in the case where the part to be repaired is a curved plane, it is possible to mold the repair patch which can be prevented from peeling off from the part to be repaired.

According to the present invention, there is provided a method for repairing a composite material by which a part to be repaired which is a repair target of the composite material is repaired, in which a repair patch which is made of a composite material to repair the part to be repaired is prepared, in which the part to be repaired is an outer peripheral surface with a cylindrical shape which extends along an axial direction, in which a surface of the repair patch which is opposite to a bonding surface, which is bonded to the part to be repaired in a thickness direction, has a curved plane with a first surface side curvature radius which protrudes from a side of the bonding surface toward the surface in a cross section which is cut along a plane intersecting a predetermined direction in the surface, in which an outer peripheral surface of the part to be repaired has a curved plane with a second surface side curvature radius which protrudes from a side of the outer peripheral surface toward an outer side of the cylindrical shape in a cross section which is cut along a plane intersecting the predetermined direction in the surface, and in which the first surface side curvature radius is smaller than the second surface side curvature radius, the method includes an adhesive agent alignment step of disposing an adhesive agent on a bonded surface of the part to be repaired; a repair patch alignment step of aligning the bonding surface of the repair patch to face the bonded surface with the adhesive agent interposed between the bonding surface and the bonded surface; and a bonding step of bonding the repair patch to the part to be repaired.

In addition, according to the present invention, there is provided another method for repairing a composite material by which a part to be repaired which is a repair target of the composite material is repaired, in which a repair patch which is made of a composite material to repair the part to be repaired is prepared, in which the part to be repaired is an inner peripheral surface with a cylindrical shape which extends along an axial direction, in which a surface of the repair patch which is opposite to a bonding surface, which is bonded to the part to be repaired in a thickness direction, has a curved plane with a first surface side curvature radius which is recessed from a side of the surface toward the bonding surface in a cross section which is cut along a plane intersecting a predetermined direction in the surface, in which an inner peripheral surface of the part to be repaired has a curved plane with a second surface side curvature radius which is recessed from an inner side of the cylindrical shape toward the inner peripheral surface in a cross section which is cut along a plane intersecting the predetermined direction in the surface, in which the first surface side curvature radius is larger than the second surface side curvature radius, the method includes an adhesive agent alignment step of disposing an adhesive agent on a bonded surface of the part to be repaired; a repair patch alignment step of aligning the bonding surface of the repair patch to face the bonded surface with the adhesive agent interposed between the bonding surface and the bonded surface; and a bonding step of bonding the repair patch to the part to be repaired.

According to this configuration, even in the case where the part to be repaired is a curved plane, since the repair patch can be bonded to the part to be repaired, it is possible to prevent the repair patch from peeling off from the part to be repaired, and it is possible to suitably repair the part to be repaired.

In addition, it is preferable that in the bonding step, the repair patch is covered with a vacuum bag and an inside of the vacuum bag is vacuumed, so that the inside of the vacuum bag is brought into a vacuum state where the repair patch is pressed against the part to be repaired, and the adhesive agent is heated in the vacuum state, so that the repair patch is bonded to the part to be repaired. It is preferable that a difference between the second curvature radius and the first curvature radius is a difference where in the vacuum state, a gap between the part to be repaired and the repair patch is smaller than a thickness of the adhesive agent.

According to this configuration, it is possible to properly bring the part to be repaired and the repair patch into close contact with the adhesive agent in the vacuum state. For this reason, it is possible to prevent bubbles from entering the gap between the part to be repaired and the repair patch.

In addition, it is preferable that the method for repairing a composite material further includes a positioning step of positioning a position of the repair patch with respect to the part to be repaired before the bonding step is performed, in which in the positioning step, the repair patch is covered with a vacuum bag and an inside of the vacuum bag is vacuumed, so that the repair patch is pressed against the part to be repaired.

According to this configuration, it is possible to perform the positioning of the part to be repaired, the repair patch, and the adhesive agent, and in the bonding step which is a post-process, the part to be repaired, the repair patch, and the adhesive agent are bonded together in a properly positioned state. For this reason, it is possible to suitably bond the repair patch to the part to be repaired.

In addition, it is preferable that the composite material of the repair patch is obtained by infiltrating reinforcing fibers with a thermosetting resin and precuring the thermosetting resin, and the adhesive agent is the thermosetting resin. It is preferable that in the bonding step, the repair patch is covered with a vacuum bag and an inside of the vacuum bag is vacuumed, so that the inside of the vacuum bag is brought into the vacuum state where the repair patch is pressed against the part to be repaired, and the thermosetting resin is heated in the vacuum state, so that the repair patch is bonded to the part to be repaired. It is preferable that in the bonding step, the thermosetting resin is heated to a glass transition temperature or greater at a predetermined temperature rise speed.

According to this configuration, the repair patch in a precured state can be arranged in the part to be repaired. For this reason, when the repair patch is to be completely cured, it is possible to soften the repair patch. Therefore, the repair patch can be suitably fitted to the part to be repaired, namely, the shape of the repair patch is capable of following the shape of the part to be repaired. For this reason, it is possible to prevent a residual stress from occurring in the repair patch, and it is possible to further prevent the repair patch from peeling off from the part to be repaired.

In addition, it is preferable that the predetermined temperature rise speed is a temperature rise speed where a heating temperature is raised at five degrees or greater per minute.

According to this configuration, since it is possible to rapidly heat the repair patch and the adhesive agent to the glass transition temperature or greater, it is possible to suitably soften the repair patch and the adhesive agent before the repair patch and the adhesive agent are completely cured.

DESCRIPTION OF EMBODIMENTS

Hereinafter, an embodiment according to the present invention will be described in detail with reference to the drawings. Incidentally, this invention is not limited by the embodiment. In addition, configuration elements in the following embodiment include configuration elements which can be easily replaced by those skilled in the art, or substantially the same configuration elements. Furthermore, the configuration elements which will be described hereinafter can be properly combined together, and in the case where there are a plurality of embodiments, the embodiments can be also combined together.

Embodiment

A repair patch 10 according to the embodiment is a repair material which is used in repairing a composite material 1. A method for repairing the composite material 1 with the repair patch 10 is a method in which a defect part which is formed in the composite material 1 by damage or the like is a repair target, and a part 5 to be repaired which is the repair target is repaired.

Figure 1:
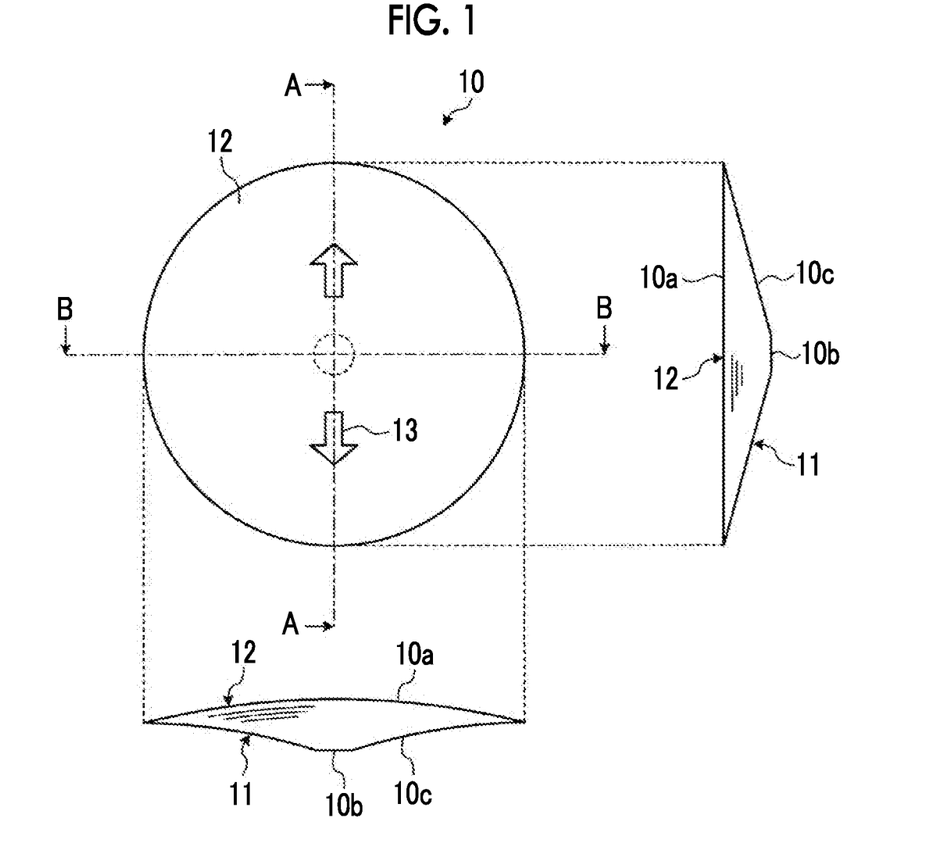
FIG. 1 is a three-sided view schematically showing a repair patch which is used in a method for repairing a composite material in an embodiment.
Figure 2:
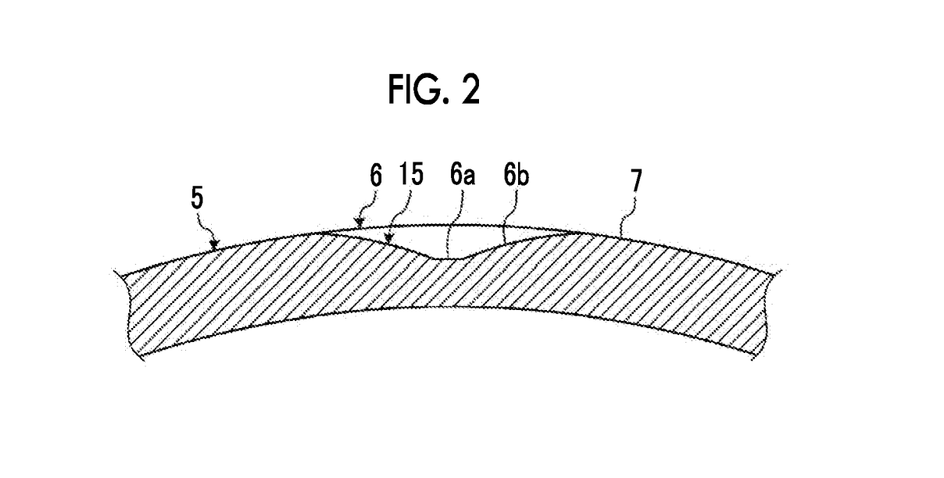
FIG. 2 is a cross-sectional view schematically showing a part to be repaired which is a target in the method for repairing a composite material in the embodiment.
Figure 3:
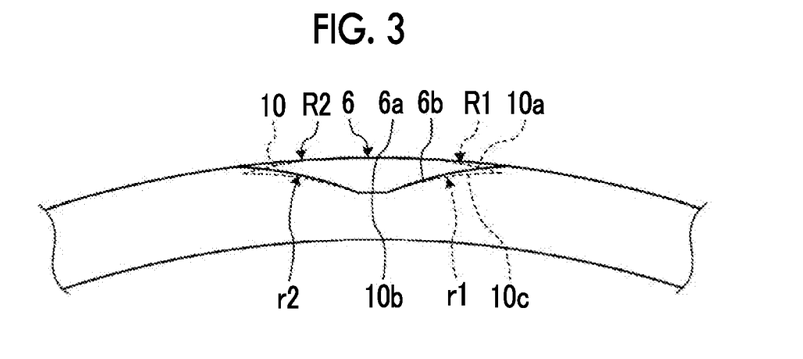
FIG. 3 is a description view comparing the shape of a counterbored hole of the part to be repaired to the shape of the repair patch.
Figure 4:
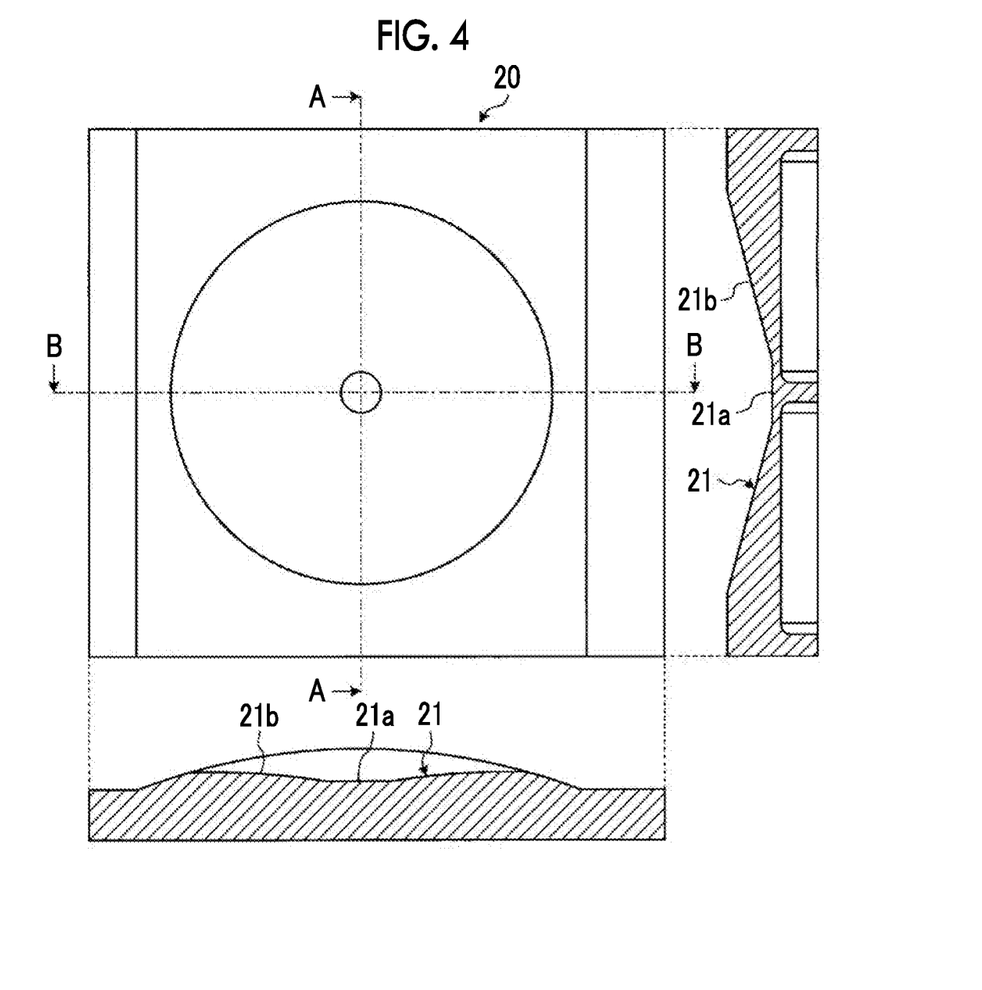
FIG. 4 is a three-sided view schematically showing a molding jig for molding a repair patch in the embodiment.
Figure 5:
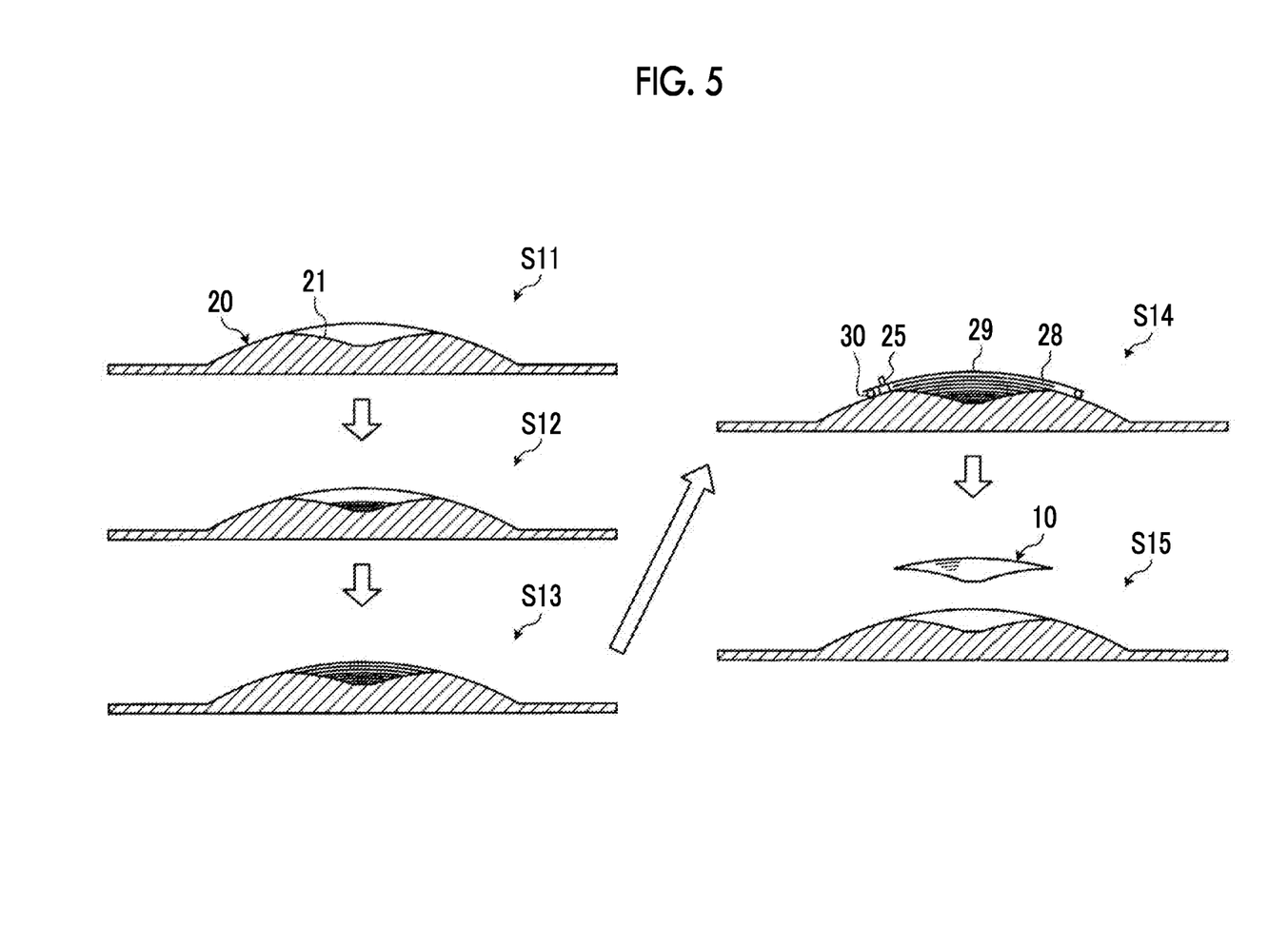
FIG. 5 is a description view of an example relating to a method for molding a repair patch in the embodiment.
Figure 6:
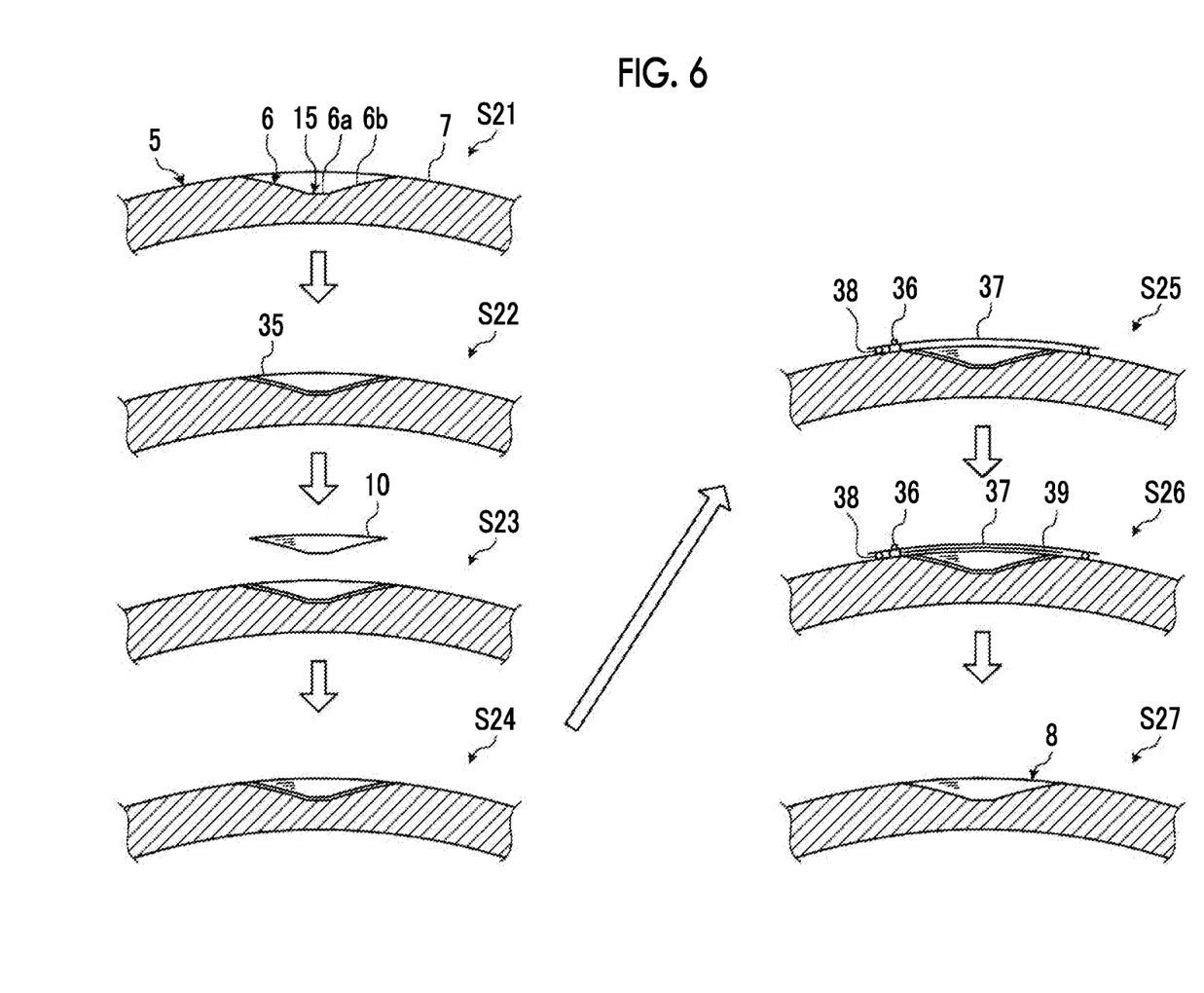
FIG. 6 is a description view of an example relating to the method for repairing a composite material with a repair patch in the embodiment.

FIG. 1 is a three-sided view schematically showing the repair patch which is used in the method for repairing a composite material in the embodiment. FIG. 2 is a cross-sectional view schematically showing the part to be repaired which is a target in the method for repairing a composite material in the embodiment. FIG. 3 is a description view comparing the shape of a counterbored hole of the part to be repaired to the shape of the repair patch. FIG. 4 is a three-sided view schematically showing a molding jig for molding the repair patch in the embodiment. FIG. 5 is a description view of an example relating to a method for molding a repair patch in the embodiment. FIG. 6 is a description view of an example relating to the method for repairing a composite material with a repair patch in the embodiment.

Firstly, the repair patch 10 will be described with reference to FIG. 1. The repair patch 10 is made of a composite material, and has a shape which is deformed from a truncated cone shape having a bottom surface 10a, a top surface 10b, and a side surface 10c to be curved from one side to the other side in one direction (rightward and leftward direction in FIG. 1). For this reason, the repair patch 10 is formed, in a plan view, into a circular shape which is distorted as much as the curve. In the repair patch 10, the top surface 10b and the side surface 10c form a bonding surface 11 which is bonded to the part 5 to be repaired, and the bottom surface 10a is a surface 12 which is opposite to the bonding surface 11.

The repair patch 10 is produced by laminating and pre-curing a plurality of prepregs as fiber reinforced preforms. The prepreg is produced by infiltrating reinforcing fibers with a resin. As the reinforcing fibers, for example, carbon fibers are used; however, the reinforcing fibers are not limited to carbon fibers, and in addition thereto, may be plastic fibers, glass fibers, natural fibers, or metallic fibers. A thermosetting resin is preferable as the resin; however, the resin may be a thermoplastic resin. The thermosetting resin is, for example, an epoxy resin. Examples of the thermoplastic resin are polyetheretherketone (PEEK), polyetherketoneketone (PEKK), and polyphenylenesulfide (PPS). Incidentally, the resin is not limited to the above-described resins, and other resins may be used. In addition, the repair patch 10 may be molded by methods such as hand layup, resin infusion, and RTM in addition to the molding using the prepregs.

Figure 9:
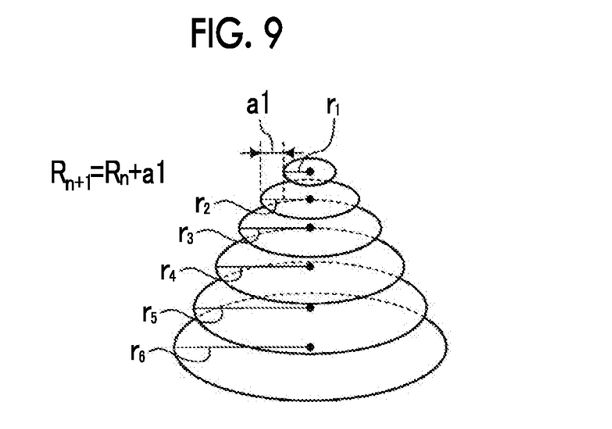
FIG. 9 is a description view showing the structure of the repair patch.

Specifically, as shown in FIG. 9, a plurality of prepregs cut into a circular shape are used to produce the repair patch 10, and the plurality of prepregs are cut into a circular shape such that the diameters of the prepregs increase at a constant ratio (a1). The repair patch 10 with a truncated cone shape is produced by laminating, in order of size, the prepregs together in a state where the central axes are aligned. Here, when the radius of a prepreg with the smallest diameter is $r_1$, and the radius of a prepreg with a diameter increasing at the ratio a1 is $r_2$, $r_2=r_1+a1$. Similarly, when the radius of a prepreg with a diameter increasing at the ratio a1 with respect to a prepreg with a radius $r_n$ is $r_{n+1}$, $r_{n+1}=r_n+a1$.

The bonding surface 11 has the top surface 10b and the side surface 10c. Each of the side surfaces 10c which are positioned on both sides of the top surface 10b interposed therebetween is a curved plane which protrudes from a side of the bonding surface 11 toward the surface in a cross section (cross section B-B) that is cut along a plane which is orthogonal to a predetermined direction (an axial direction of the composite material 1 which will be described later and an upward and downward direction in FIG. 1) in the bonding surface 11. On the other hand, each of the side surfaces 10c which are positioned on both sides of the top surface 10b interposed therebetween is a straight inclined surface in a cross section (cross section A-A) that is cut along a plane which is orthogonal to a direction (a circumferential direction of the composite material which will be described later and the rightward and leftward direction in FIG. 1) orthogonal to the axial direction in the bonding surface 11. At the time, in the cross section B-B, the curvature radius of the side surface 10c which is a curved plane is a first curvature radius r1.

The surface 12 is the bottom surface 10a, and in the cross section B-B, the bottom surface 10a is a curved plane which protrudes from the side of the bonding surface 11 toward the surface 12. On the other hand, in the cross section A-A, the bottom surface 10a is a straight planar surface. At the time, in the cross section B-B, a first surface side curvature radius R1 of the surface 12 which is a curved plane is smaller than a second surface side curvature radius of a surface (outer peripheral surface) of the part 5 to be repaired which will be described later. In addition, an indicator 13 with which the axial direction of the repair patch 10 can be visually recognized is attached to the surface 12. An arrow is provided as an example of the indicator 13; however, the indicator 13 is not limited to the arrow, and is not specifically limited as long as the axial direction of the repair patch 10 can be recognized therewith.

Subsequently, the part 5 to be repaired to which the repair patch 10 is bonded will be described with reference to FIG. 2. The part 5 to be repaired which is a repair target is formed on a surface side (upper side in FIG. 2) of the composite material 1, the repair patch 10 is bonded to the part 5 to be repaired, and curing is performed thereon; and thereby, a repaired part 8 is formed. The composite material 1 has a cylindrical shape which extends along the axial direction, and the part 5 to be repaired is an outer peripheral surface 7 of the composite material 1. In a cross section which is cut along a plane orthogonal to the axial direction, a second surface side curvature radius R2 of the outer peripheral surface 7 of the part 5 to be repaired is larger than the first surface side curvature radius R1 of the surface 12 of the repair patch 10.

The composite material 1 is, for example, a carbon fiber reinforced plastic (CFRP) in which carbon fibers are used as reinforcing fibers. Incidentally, in the composite material 1, similar to the repair patch 10, any fibers may be used as the reinforcing fibers, and any resins may be used as a resin, and the reinforcing fibers and the resin are not specifically limited.

A counterbored hole 6 with a bottom which has a bottom surface 6a and a side surface 6b is formed in the part 5 to be repaired. An opening portion of the counterbored hole 6 is formed into a circular shape, and the bottom surface 6a is formed into a circular shape which is smaller than that of the opening portion. In addition, the side surface 6b of the counterbored hole 6 is an inclined surface such that the counterbored hole 6 becomes widened from the bottom surface 6a toward the opening portion. The bottom surface 6a and the side surface 6b of the counterbored hole 6 form a bonded surface 15 to which the repair patch 10 is bonded.

The bonded surface 15 has the bottom surface 6a and the side surface 6b. The bottom surface 6a of the bonded surface 15 faces the top surface 10b of the bonding surface 11, and the side surface 6b of the bonded surface 15 faces the side surface 10c of the bonding surface 11. Here, in the cross section shown in FIG. 2 which is cut along the plane orthogonal to the axial direction, the side surface 6b of the counterbored hole 6 is a curved plane which protrudes toward the side surface 6b of the bonding surface 11 which faces the side surface 6b. At the time, in the cross section shown in FIG. 2, the curvature radius of the side surface 6b which is a curved plane is a second curvature radius r2.

Subsequently, the shape of the repair patch 10 (dotted line) and the shape of the counterbored hole 6 (solid line) are comparatively described with reference to FIG. 3. As shown in FIG. 3, when in the cross section shown in FIG. 3 which is cut along the plane orthogonal to the axial direction, the shape of the repair patch 10 is compared to the shape of the counterbored hole 6, the first surface side curvature radius R1 of the bottom surface 10a (the surface 12) of the repair patch 10 is smaller than the second surface side curvature radius R2 of the outer peripheral surface 7 of the part 5 to be repaired. In addition, the first curvature radius r1 of the side surface 10c of the repair patch 10 is smaller than the second curvature radius r2 of the side surface 6b of the counterbored hole 6 of the part 5 to be repaired.

For this reason, when the repair patch 10 is bonded to the counterbored hole 6, both sides of the repair patch in the circumferential direction of the outer peripheral surface of the part 5 to be repaired are bent, and thus, a residual stress occurs in a direction where the repair patch 10 approaches the side surface 6b of the counterbored hole 6.

Subsequently, a method for molding the repair patch 10 will be described with reference to FIGS. 4 and 5. In the method for molding the repair patch 10, the repair patch 10 is molded by a molding jig 20. Firstly, the molding jig 20 will be described with reference to FIG. 4.

The molding jig 20 has a mold surface 21 for molding the repair patch 10, and the mold surface 21 is a surface for molding the bonding surface 11 of the repair patch 10. Namely, the mold surface 21 has a shape complementary to the bonding surface 11 of the repair patch 10. Specifically, the mold surface 21 with a bottom which has a bottom surface 21a and a side surface 21b is formed in the molding jig 20. An opening portion is formed on an upper side of the mold surface 21. The opening portion is formed into a circular shape, and the bottom surface 6a is formed into a circular shape which is smaller than that of the opening portion. In addition, the side surface 21b of the mold surface 21 is an inclined surface such that the mold surface 21 becomes widened from the bottom surface 21a toward the opening portion. Then, in the mold surface 21, the bottom surface 21a is a surface for molding the top surface 10b of the repair patch 10, and the side surface 21b is a surface for molding the side surface 10c of the repair patch 10. Since the mold surface 21 has a shape complementary to the bonding surface 11 of the repair patch 10, the side surface 21b of the mold surface 21 is a curved plane with the first curvature radius r1 which protrudes toward the fiber reinforced preforms disposed on the mold surface 21. Then, the side surface 10c of the repair patch 10 is molded into a curved plane with the first curvature radius r1 by the mold surface 21 of the molding jig 20; and thereby, it is possible to mold the bottom surface 10a of the repair patch 10 into a curved plane with the first surface side curvature radius R1.

As shown in FIG. 5, in the method for molding the repair patch 10, the repair patch 10 is molded by using the molding jig 20 shown in FIG. 4. Specifically, in the method for molding the repair patch 10, firstly, the molding jig 20 is prepared (Step S11: preparation step). Consecutively, in the method for molding the repair patch 10, a plurality of fiber reinforced preforms are laminated on the mold surface 21 of the molding jig 20 (Step S12: lay-up step). In the lay-up step S12, circular fiber reinforced preforms with small diameters are laminated from a side of the bottom surface 21a of the mold surface 21, and circular fiber reinforced preforms with large diameters are laminated toward an opening side of the mold surface 21 (Step S13). In addition, in the lay-up step S12, vacuum suction is performed whenever a predetermined number of the fiber reinforced preforms are laminated. Namely, when the fiber reinforced preforms are laminated, since there is a possibility that gaps are formed between layers of the laminated fiber reinforced preforms, the gaps formed between the layers of the fiber reinforced preforms are removed by regularly performing vacuum suction.

In the method for molding the repair patch 10, after Step S13, a plurality of the laminated fiber reinforced preforms are heated to be molded (Step S14: molding step). In the molding step S14, a heater mat 28 is installed on a surface of the plurality of laminated fiber reinforced preforms, and a vacuum suction port 25 is installed. The heater mat 28 heats prepregs to a predetermined temperature where a resin of the prepregs as the fiber reinforced preforms are melt and a part thereof is thermally cured. In addition, in the molding step S14, a bag film (vacuum bag) 29 is disposed to cover the heater mat 28 with a sealing member 30 interposed between the bag film 29 and the molding jig 20. The bag film 29 is slightly larger than the repair patch 10, and the sealing member 30 is airtightly disposed between the bag film 29 and the molding jig 20.

In the molding step S14, the inside of the bag film 29 is brought into a vacuum state by vacuuming the inside of the bag film 29 through the vacuum suction port 25. Then, in the molding step S14, heating is performed in a vacuum state by the heater mat 28, and thus, the repair patch 10 which is precured is molded.

In the method for molding the repair patch 10, after the molding step S14, the repair patch 10 which is molded is removed from the molding jig 20 (Step S15: removal step).

Subsequently, a method for repairing the composite material 1 having the part 5 to be repaired will be described with reference to FIG. 6. In the method for repairing the composite material 1, the repair patch 10 and a resin sheet 35 as an adhesive agent are used. The resin sheet 35 is produced by forming a resin into a sheet shape, and is made of a material which is bondable to the resin used in the repair patch 10. Incidentally, the resin sheet 35 may be the same as or different from the resin used in the repair patch 10, and is not specifically limited. In addition, a plurality of types of the repair patches 10 with different diameters are prepared, and the repair patch 10 is properly selected and used depending on the shape (size) of the counterbored hole 6 which is to be formed.

In the method for repairing the composite material 1, a counterbored hole forming step S21, a resin sheet alignment step (adhesive agent alignment step) S22, a repair patch alignment step S24, a positioning step S25, and a molding step (bonding step) S26 are performed in order. Before the part to be repaired forming step S21 is performed, a defect part is formed in a surface of the composite material 1.

In the counterbored hole forming step S21, the counterbored hole 6 with the shape shown in FIGS. 2 and 6 is formed by performing machining or the like on the defect part formed in the surface of the composite material 1. In the counterbored hole forming step S21, the counterbored hole 6 is formed into the shape shown in FIGS. 2 and 6, and the shape can be suitable for repair. Specifically, the counterbored hole 6 is processed such that the number of lay-ups of fiber reinforced preforms which are removed from the part 5 to be repaired of the composite material 1 by the processing is the same as the number of lay-ups of the repair patch 10. At the time, similar to that the radius of the repair patch 10 increases at the constant ratio (a1), the counterbored hole 6 is processed such that the radius of the counterbored hole 6 increases at the constant ratio (a1) from the bottom surface 6a toward the opening portion. At the time, the counterbored hole 6 is processed such that the radius of the bottom surface 6a of the counterbored hole 6 is substantially the same as the radius of the top surface 10b with the smallest diameter in the repair patch 10. For this reason, the actual length of the side surface 10c of the repair patch 10 is substantially the same as that of the side surface 6b of the counterbored hole 6 in a radial direction.

In the resin sheet alignment step S22, the resin sheet 35 is arranged in the counterbored hole 6 which is recessed from the surface of the composite material 1. Specifically, in the resin sheet alignment step S22, the resin sheet 35 is arranged to come into contact with the bottom surface 6a and the side surface 6b of the counterbored hole 6 and cover the bottom surface 6a and the side surface 6b.

In the repair patch alignment step S24, the repair patch 10 is arranged on the resin sheet 35. At the time, since the first curvature radius r1 of the repair patch 10 is smaller than the second curvature radius r2 of the counterbored hole 6, in the circumferential direction of the part 5 to be repaired, a central portion of the repair patch 10 may rise upward slightly, and both sides of the repair patch 10 come into contact with the resin sheet 35. In addition, in the repair patch alignment step S24, based on the indicator 13 attached to the surface of the repair patch 10, the repair patch 10 is arranged in the counterbored hole 6 with the resin sheet 35 interposed therebetween such that an axial direction of the part 5 to be repaired where the counterbored hole 6 is formed coincides with the axial direction of the repair patch 10.

In the positioning step S25, the positioning of the repair patch 10 is performed with respect to the counterbored hole 6. In the positioning step S25, a vacuum suction port 36 is installed, and a bag film (vacuum bag) 37 is arranged to cover the repair patch 10 with a sealing member 38 interposed between the bag film 37 and the part 5 to be repaired. The bag film 37 is slightly larger than the repair patch 10, and the sealing member 30 is airtightly disposed between the bag film 37 and the part 5 to be repaired. In the positioning step S25, the inside of the bag film 37 is brought into a vacuum state by vacuuming the inside of the bag film 37 through the vacuum suction port 36. Then, in the positioning step S25, in a vacuum state, it is confirmed whether or not the position of the repair patch 10 with respect to the counterbored hole 6 is a proper position. Specifically, in the positioning step S25, in a vacuum state, it is confirmed whether or not a gap between the counterbored hole 6 and the repair patch 10 is smaller than the thickness of the resin sheet 35. Namely, the difference between the second surface side curvature radius R2 and the first surface side curvature radius R1, in other words, the difference between the second curvature radius r2 and the first curvature radius r1 is a difference where in a vacuum state, the gap between the counterbored hole 6 and the repair patch 10 is smaller than the thickness of the resin sheet 35. After the confirmation, in the positioning step S25, the vacuum state is released, and the bag film 37 is removed.

In the molding step S26, a heater mat 39 is installed on the repair patch 10 which is positioned, and the vacuum suction port 36 is installed. The heater mat 39 heats the repair patch 10 and the resin sheet 35 to a glass transition temperature or greater where the resins of the repair patch 10 and the resin sheet 35 are melt and are completely cured. In addition, in the molding step S26, similar to the positioning step S25, the bag film 37 is arranged to cover the heater mat 39 with the sealing member 38 interposed between the bag film 37 and the part 5 to be repaired.

Then, in the molding step S26, the inside of the bag film 37 is brought into a vacuum state by vacuuming the inside of the bag film 37 through the vacuum suction port 36. Then, in the molding step S26, in a vacuum state, the resins are melt by the heater mat 39 and the resins are completely cured, and thus, the repair patch 10 and the resin sheet 35 are cured integrally with the part 5 to be repaired to form the repaired part 8 (Step S27). At the time, in the molding step S26, the heating temperature is raised such that the temperature rise speed becomes 5 degrees or greater per minute. The reason is that since it is possible to rapidly heat the repair patch 10 and the resin sheet 35, it is possible to suitably soften the resins before the repair patch 10 and the resin sheet 35 are completely cured.

As described above, according to the embodiment, since the surface 12 is capable of having a curved plane with the first surface side curvature radius R1, even in the case where the outer peripheral surface 7 of the part 5 to be repaired is a curved plane, the repair patch 10 can be bonded according to the shape of the outer peripheral surface 7. Therefore, it is possible to reduce a residual stress which occurs in a peripheral edge portion of the repair patch 10 to separate the peripheral edge portion from the part 5 to be repaired, and it is possible to prevent the repair patch 10 from peeling off from the part 5 to be repaired.

In addition, according to the embodiment, since the curvature radius of the curved plane of the surface 12 of the repair patch 10 is smaller than that of the curved plane of the outer peripheral surface 7 of the part 5 to be repaired, when the repair patch 10 is bonded to the counterbored hole 6, a residual stress occurs in a direction where the peripheral edge portion of the repair patch 10 approaches the counterbored hole 6. For this reason, it is possible to apply the residual stress which occurs in the peripheral edge portion of the repair patch 10 to cause the peripheral edge portion to approach the counterbored hole 6, and it is possible to further prevent the repair patch 10 from peeling off from the counterbored hole 6. In addition, since the repair patch 10 is molded as described above, the repair patch 10 can be easily fitted to the counterbored hole 6, and thus, even in the case where a plurality of types of the repair patches 10 are prepared in advance, the part to be repaired can be dealt with a small number of types of the repair patches 10.

In addition, according to the embodiment, the repair patch 10 in a precured state can be arranged in the counterbored hole 6. For this reason, when the repair patch 10 is to be completely cured, it is possible to soften the repair patch 10. Therefore, the repair patch can be suitably fitted to the counterbored hole 6, namely, the shape of the repair patch 10 is capable of following the shape of the counterbored hole 6. For this reason, it is possible to prevent a residual stress from occurring in the repair patch 10, and it is possible to further prevent the repair patch 10 from peeling off from the counterbored hole 6.

In addition, according to the embodiment, it is possible to suitably bond the repair patch 10 to the part 5 to be repaired having an outer peripheral surface with a cylindrical shape, namely, a so-called single contour plane.

In addition, according to the embodiment, since the indicator 13 is attached to the surface 12 of the repair patch 10, it is possible to properly arrange the posture of the repair patch 10 with respect to the counterbored hole 6.

In addition, according to the embodiment, since the mold surface 21 of the molding jig 20 is a surface for molding the bonding surface 11 of the repair patch 10, it is possible to accurately mold the shape of the bonding surface 11.

In addition, according to the embodiment, since in a vacuum state, it is possible to make the gap between the counterbored hole 6 and the repair patch 10 smaller than the thickness of the resin sheet 35, it is possible to properly bring the counterbored hole 6 and the repair patch 10 into close contact with the resin sheet 35. For this reason, it is possible to prevent bubbles from entering the gap between the counterbored hole 6 and the repair patch 10.

In addition, according to the embodiment, since it is possible to perform the positioning of the counterbored hole 6, the repair patch 10, and the resin sheet 35 in the positioning step S25, it is possible to suitably bond the repair patch 10 to the counterbored hole 6.

In addition, according to the embodiment, the repair patch 10 in a precured state can be arranged in the counterbored hole 6. For this reason, when the repair patch is to be completely cured, it is possible to soften the repair patch 10. Therefore, the repair patch 10 can be suitably fitted to the counterbored hole 6. For this reason, it is possible to prevent a residual stress from occurring in the repair patch 10, and it is possible to further prevent the repair patch 10 from peeling off from the counterbored hole 6.

In addition, according to the embodiment, since it is possible to set the temperature rise speed at five degrees or greater per minute, it is possible to rapidly heat the repair patch 10 and resin sheet 35 to the glass transition temperature or greater; and thereby, it is possible to suitably soften the repair patch 10 and the resin sheet 35 before the repair patch 10 and the resin sheet 35 are completely cured.

Incidentally, a peel ply which can be peeled off from the bonding surface 11 may be provided on the bonding surface 11 of the repair patch 10 of the embodiment. According to this configuration, since it is possible to activate the bonding surface 11 of the repair patch 10 by pulling off the peel ply, it is possible to improve the property of bonding to the counterbored hole 6.

In addition, in the embodiment, it is not necessary to set the first surface side curvature radius R1 of the surface 12 of the repair patch 10 at a predetermined curvature radius, and the first surface side curvature radius R1 may decrease from the central portion of the repair patch 10 toward an outer side in the circumferential direction of the part 5 to be repaired. According to this configuration, the peripheral edge portion with a thin thickness on the outer side of the repair patch 10 is easily deformed. For this reason, the first surface side curvature radius R1 on the outer side is smaller than that of the central portion, and thus, the peripheral edge portion of the repair patch 10 is easily fitted to the counterbored hole 6.

Figure 7:
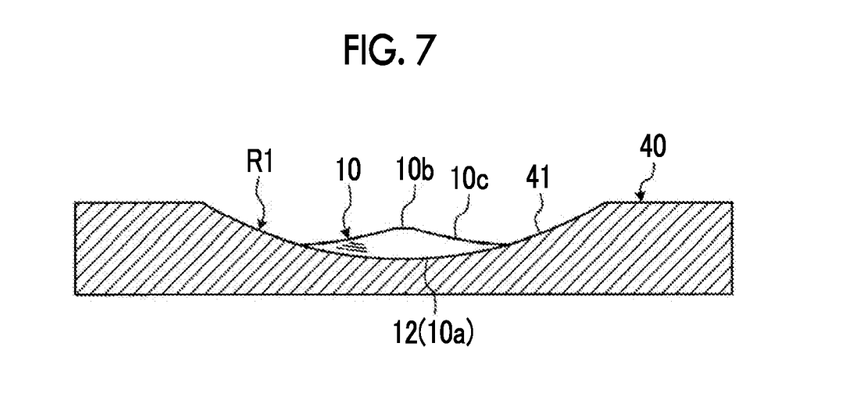
FIG. 7 is a cross-sectional view schematically showing another example of the molding jig for molding a repair patch in the embodiment.

Furthermore, instead of the molding jig 20 of the embodiment, a molding jig 40 shown in FIG. 7 may be used. FIG. 7 is a cross-sectional view schematically showing another example of the molding jig for molding a repair patch in the embodiment.

The molding jig 40 shown in FIG. 7 has a mold surface 41 for molding the repair patch 10, and the mold surface 41 is a surface for molding the surface 12 of the repair patch 10. Namely, the mold surface 41 has a shape complementary to the surface 12 of the repair patch 10. Specifically, the mold surface 41 with the first surface side curvature radius R1 is formed in the molding jig 40. The first surface side curvature radius R1 of the mold surface 41 is smaller than the second surface side curvature radius R2 of the outer peripheral surface 7 of the part 5 to be repaired. An opening portion is formed on an upper side of the mold surface 41, and the opening portion is formed into a circular shape. The mold surface 41 is a curved plane which protrudes downward in a cross section which is cut along a plane orthogonal to the axial direction. Namely, when the molding jig 40 shown in FIG. 7 is compared to the molding jig 20 shown in FIG. 4, the first surface side curvature radius R1 of the mold surface of the molding jig 40 is the same as that of the surface of the molding jig 20, and the first curvature radius r1 of the side surface 10c of the repair patch 10 formed by the molding jig 40 is the same as that of the side surface 21b of the molding jig 20.

According to this configuration, since the mold surface 41 of the molding jig 40 is a surface for molding the surface 12 of the repair patch 10, it is possible to accurately mold the shape of the surface 12.

Figure 8:
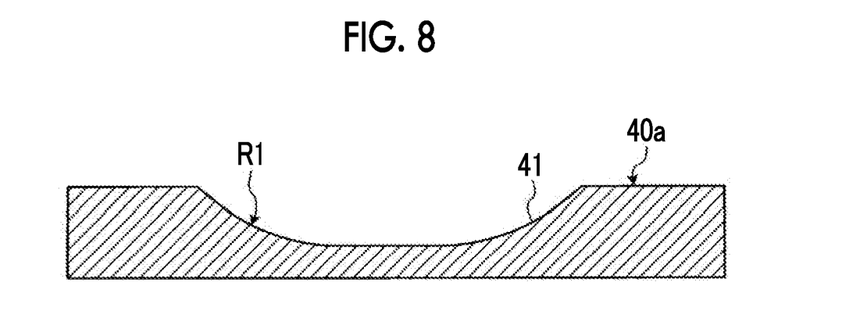
FIG. 8 is a cross-sectional view schematically showing the other example of the molding jig for molding a repair patch in the embodiment.

In addition, as a modification example of the molding jig 40 shown in FIG. 7, a molding jig 40a shown in FIG. 8 may be used such that the first surface side curvature radius R1 of the surface 12 of the repair patch decreases from the central portion toward the outer side. Specifically, in the molding jig 40a shown in FIG. 8, the diameter of the mold surface 41 with the first surface side curvature radius R1 is changed such that the diameter decreases from a central portion toward the outer side, and thus, also the first curvature radius r1 of the repair patch 10 is changed.

Figure 10:
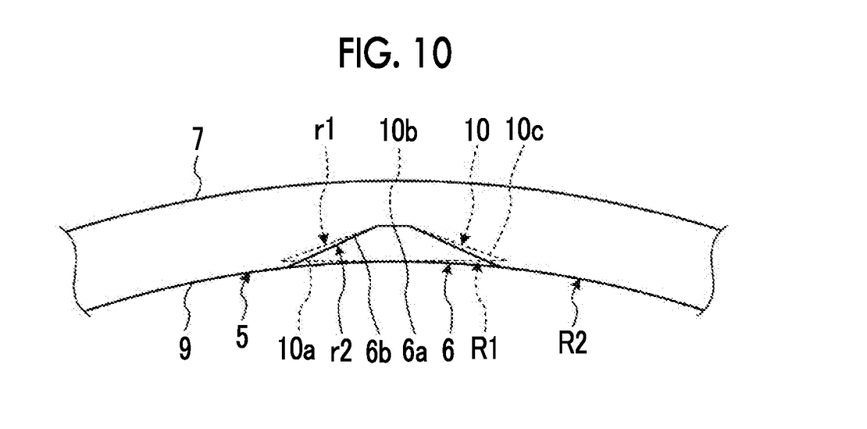
FIG. 10 is a description view of another example where the shape of a counterbored hole of a part to be repaired is compared to the shape of a repair patch.

In addition, in the embodiment, the outer peripheral surface 7 of the composite material 1 is employed as the part 5 to be repaired; however, as shown in FIG. 10, an inner peripheral surface 9 of the composite material 1 may be employed. In this case, the counterbored hole 6 with a bottom which has the bottom surface 6a and the side surface 6b is formed in the part 5 to be repaired, and has substantially the same configuration as that of the counterbored hole 6 described above. In addition, also the repair patch 10 has the bottom surface 10a, the top surface 10b, and the side surface 10c, and has substantially the same configuration as that of the repair patch 10 described above.

Here, the second surface side curvature radius R2 of the inner peripheral surface 9 of the part 5 to be repaired is smaller than the first surface side curvature radius R1 of the surface 12 (10a) of the repair patch 10. In other words, in a cross section which is cut along a plane orthogonal to the axial direction, a second surface side curvature radius R2 of the outer peripheral surface 9 of the part 5 to be repaired is larger than the first surface side curvature radius R1 of the surface 12 (10a) of the repair patch 10. On the other hand, the second curvature radius r2 of the side surface 6b of the counterbored hole 6 is larger than the first curvature radius r1 of the side surface 10c of the repair patch 10. In other words, the first curvature radius r1 of the side surface 10c of the repair patch 10 is smaller than the second curvature radius r2 of the side surface 6b of the counterbored hole 6 of the part 5 to be repaired.

For this reason, even in the case where the inner peripheral surface 9 of the composite material 1 is employed as the part 5 to be repaired, since the first surface side curvature radius R1 of the surface 12 of the repair patch 10 is larger than the second surface side curvature radius R2 of the inner peripheral surface 9, and the first curvature radius r1 of the side surface 10c of the repair patch 10 is a curvature radius which is smaller than the second curvature radius r2 of the side surface 6b of the counterbored hole 6, when the repair patch 10 is bonded to the counterbored hole 6, a residual stress occurs in the direction where the peripheral edge portion of the repair patch 10 approaches the counterbored hole 6. For this reason, it is possible to apply the residual stress which occurs in the peripheral edge portion of the repair patch 10 to cause the peripheral edge portion to approach the counterbored hole 6, and it is possible to prevent the repair patch 10 from peeling off from the counterbored hole 6.

Figure 11:
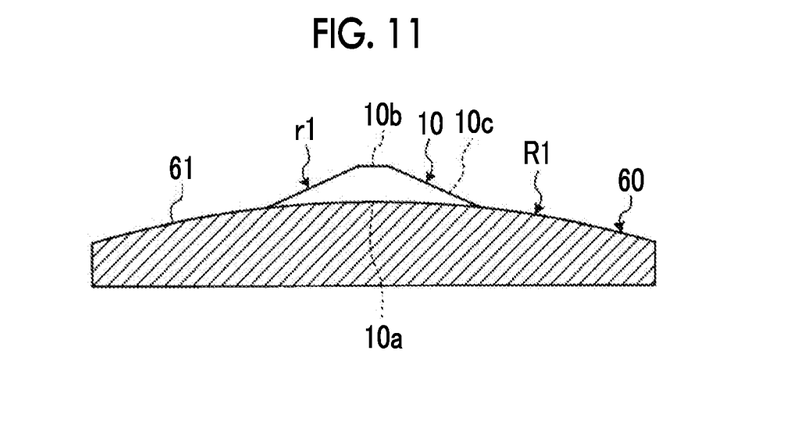
FIG. 11 is a cross-sectional view schematically showing another example of the molding jig for molding a repair patch in the embodiment.

Here, as a molding jig for molding the repair patch 10 shown in FIG. 10, a molding jig 60 shown in FIG. 11 is used.

The molding jig 60 shown in FIG. 11 has a mold surface 61 for molding the repair patch 10, and the mold surface 61 is a surface for molding the surface 12 (10a) of the repair patch 10. Namely, the mold surface 61 has a shape complementary to the surface 12 of the repair patch 10. Specifically, the mold surface 61 with the first surface side curvature radius R1 is formed in the molding jig 60. The first surface side curvature radius R1 of the mold surface 61 is larger than the second surface side curvature radius R2 of the inner peripheral surface 9 of the part 5 to be repaired.

According to this configuration, since the mold surface 61 of the molding jig 60 is a surface for molding the surface 12 of the repair patch 10, it is possible to accurately mold the shape of the surface 12 of the repair patch 10.

REFERENCE SIGNS LIST

1: Composite material
5: Part to be repaired

6: Counterbored hole
6a: Bottom surface
6b: Side surface
7: Outer peripheral surface
8: Repaired part
9: Inner peripheral surface
10: Repair patch
10a: Bottom surface
10b: Top surface
10c: Side surface
11: bonding surface
12: Surface
13: Indicator
15: Bonded surface
20: Molding jig
21: Mold surface
21a: Bottom surface
21b: Side surface
25: Vacuum suction port
28: Heater mat
29: Bag film
30: Sealing member
35: Resin sheet
36: Vacuum suction port
37: Bag film
38: Sealing member
39: Heater mat
40: Molding jig
40a: Molding jig
41: Mold surface
60: Molding jig
61: Mold surface
r1: First curvature radius
r2: Second curvature radius
R1: First surface side curvature radius
R2: Second surface side curvature radius

The invention claimed is:

1. An assembly comprising a part of a second composite material to be repaired and a repair patch made of a first composite material to be bonded to the part to be repaired, wherein the part to be repaired is a peripheral surface with a cylindrical shape extending along an axial direction, and the part to be repaired has a second bottom surface with a second distance between the peripheral surface and the second bottom surface measured in a second depth direction of the second composite material, the repair patch comprising:
   a bonding surface configured to face a bonded surface of the part to be repaired, and to be bonded to the part to be repaired; and
   a surface opposite to the bonding surface in a first thickness direction of the repair patch,
   wherein the bonding surface has a first bottom surface with a first distance between the first bottom surface and a peripheral edge of the repair patch measured in the first thickness direction, and the first bottom surface to oppose the second bottom surface,
   the opposite surface has a curved plane with a predetermined first surface side curvature radius in an intersecting plane which is a cross section along a plane intersecting a predetermined direction in the opposite surface, and
   wherein the first distance is smaller than the second distance.

2. The assembly according to claim 1,
wherein the peripheral surface of the part to be repaired is an outer peripheral surface with the cylindrical shape, wherein the outer peripheral surface has a curved plane with a second surface side curvature radius protruding from a side of the outer peripheral surface toward an outer side of the cylindrical shape in the intersecting plane,
   wherein the opposite surface has the curved plane with the first surface side curvature radius protruding from a side of the bonding surface toward the opposite surface, and
   wherein the first surface side curvature radius is smaller than the second surface side curvature radius.

3. The assembly according to claim 2,
wherein a thickness of the repair patch in the first thickness direction decreases from a central portion toward an outer side in the predetermined direction, and
   wherein the first surface side curvature radius of the opposite surface decreases from the central portion toward the outer side in the predetermined direction.

4. The assembly according to claim 1,
wherein the peripheral surface of the part to be repaired is an inner peripheral surface with the cylindrical shape,
   wherein the inner peripheral surface has a curved plane with a second surface side curvature radius which is recessed from an inner side of the cylindrical shape toward the inner peripheral surface in the intersecting plane,
   wherein the opposite surface has the curved plane with the first surface side curvature radius which is recessed from a side of the opposite surface toward the bonding surface, and
   wherein the first surface side curvature radius is larger than the second surface side curvature radius.

5. The assembly according to claim 4,
wherein a thickness of the repair patch in the first thickness direction decreases from a central portion toward an outer side in the predetermined direction, and
   wherein the first surface side curvature radius of the opposite surface increases from the central portion toward the outer side in the predetermined direction.

6. The assembly according to claim 1,
wherein the first composite material is obtained by infiltrating reinforcing fibers with a thermosetting resin, and
   wherein the thermosetting resin is precured.

7. The assembly according to claim 1, further comprising a peel ply that is peelably bonded to the bonding surface.

8. The assembly according to claim 1,
wherein an indicator with which the axial direction is visually recognizable is attached to the opposite surface.

9. A method of repairing a part of a second composite material, wherein the part to be repaired is a peripheral surface with a cylindrical shape extending along an axial direction, and the part to be repaired having a second bottom surface with a second distance between the peripheral surface and the second surface measured in a second depth direction of the second composite material, the method comprising:
   a lay-up step of laminating a plurality of fiber reinforced preforms together on a mold surface by using a molding jig having the mold surface;
   a molding step of heating and molding the plurality of laminated fiber reinforced preforms to form a repair patch made of a first composite material; and a bonding step of bonding the repair patch to the part to be repaired, wherein a surface of the repair patch opposite to a bonding surface, which is bonded to the part to be repaired in a first thickness direction of the repair patch, has a curved plane with a first surface side curvature radius in an intersecting plane which is a cross section along a plane intersecting a predetermined direction in the opposite surface, wherein the bonding surface has a first bottom surface with a first distance between the first bottom surface and a peripheral edge of the repair patch measured in the first thickness direction, and the first bottom surface to oppose the second bottom surface, and wherein the first distance is smaller than the second distance.

10. The method of repairing according to claim 9, wherein the peripheral surface of the part to be repaired is an inner peripheral surface with the cylindrical shape, wherein the opposite surface of the repair patch has a curved plane with a first surface side curvature radius which is recessed from a side of the opposite surface toward the bonding surface in the intersecting plane, wherein the inner peripheral surface has a curved plane with a second surface side curvature radius which is recessed from an inner side of the cylindrical shape toward the inner peripheral surface in the intersecting plane, and wherein the repair patch is molded by using the molding jig such that the first surface side curvature radius is larger than the second surface side curvature radius.

11. The method of repairing according to claim 9, wherein the peripheral surface of the part to be repaired is an outer peripheral surface with the cylindrical shape, wherein the opposite surface of the repair patch has a curved plane with a first surface side curvature radius which protrudes from a side of the bonding surface toward the opposite surface in the intersecting plane, wherein the outer peripheral surface has a curved plane with a second surface side curvature radius which protrudes from a side of the bonding surface toward the opposite surface in the intersecting plane, and wherein the repair patch is molded by using the molding jig such that the first surface side curvature radius is smaller than the second surface side curvature radius.

12. A method of repairing a part of a second composite material, wherein the part to be repaired is a peripheral surface with a cylindrical shape extending along an axial direction, and the part to be repaired has a second bottom surface with a second distance between the peripheral surface and the second surface measured in a second depth direction of the composite material, the method comprising:

a providing step of providing a repair patch made of a first composite material to repair the part to be repaired, wherein a surface of the repair patch opposite to a bonding surface to be bonded to the part to be repaired in a first thickness direction of the repair patch, has a curved plane with a first surface side curvature radius in an intersecting plane which is a cross section along a plane intersecting a predetermined direction in the opposite surface;

an adhesive agent alignment step of disposing an adhesive agent on a bonded surface of the part to be repaired;

a repair patch alignment step of aligning the bonding surface of the repair patch to face the bonded surface with the adhesive agent interposed between the bonding surface and the bonded surface; and a bonding step of bonding the repair patch to the part to be repaired.

13. The method of repairing according to claim 12, wherein the peripheral surface of the part to be repaired is an inner peripheral surface with the cylindrical shape, wherein the opposite surface has a curved plane with a first surface side curvature radius recessed from a side of the opposite surface toward the bonding surface in the intersecting plane, wherein the inner peripheral surface has a curved plane with a second surface side curvature radius which is recessed from an inner side of the cylindrical shape toward the inner peripheral surface in the intersecting plane, and wherein the first surface side curvature radius is larger than the second surface side curvature radius.

14. The method of repairing according to claim 12, wherein the bonding step includes covering the repair patch with a vacuum bag and vacuuming an inside of the vacuum bag so that the inside of the vacuum bag is brought into a vacuum state where the repair patch is pressed against the part to be repaired, and the adhesive agent is heated in the vacuum state, so that the repair patch is bonded to the part to be repaired, and wherein a difference between the second surface side curvature radius and the first surface side curvature radius is such that a gap between the part to be repaired and the repair patch is smaller than a thickness of the adhesive agent.

15. The method of repairing according to claim 12, further comprising:

a positioning step of positioning the repair patch with respect to the part to be repaired before the bonding step is performed, wherein the positioning step includes covering the repair patch with a vacuum bag and vacuuming an inside of the vacuum bag so that the repair patch is pressed against the part to be repaired.

16. The method of repairing a composite material according to claim 12, wherein the first composite material of the repair patch is obtained by infiltrating reinforcing fibers with a thermosetting resin and precuring the thermosetting resin, wherein the adhesive agent is the thermosetting resin, wherein the bonding step includes covering the repair patch with a vacuum bag and vacuuming an inside of the vacuum bag so that the inside of the vacuum bag is brought into the vacuum state where the repair patch is pressed against the part to be repaired, and heating the thermosetting resin in the vacuum state so that the repair patch is bonded to the part to be repaired, and wherein the bonding step includes heating the thermosetting resin to a glass transition temperature or greater at a predetermined temperature rise speed.

17. The method of repairing according to claim 16, wherein the predetermined temperature rise speed is a temperature rise speed where a heating temperature is raised at five degrees or greater per minute.

18. The method of repairing according to claim 12, wherein the peripheral surface of the part to be repaired is an outer peripheral surface with the cylindrical shape, wherein the opposite surface has a curved plane with a first surface side curvature radius protruding from a side of the bonding surface toward the opposite surface in the intersecting plane, wherein the inner peripheral surface has a curved plane with a second surface side curvature radius protruding from a side of the bonding surface toward the opposite surface in the intersecting plane, and wherein the first surface side curvature radius is smaller than the second surface side curvature radius.

* * * * *